Feb. 18, 1969     E. GERSTENBERGER     3,428,933
STRAIN GAGE UNIT AND METHOD OF APPLYING THE GAGE
Filed Aug. 29, 1966     Sheet _1_ of 2

INVENTOR.
EGON GERSTENBERGER
BY Edward M. Farrell

ATTORNEY

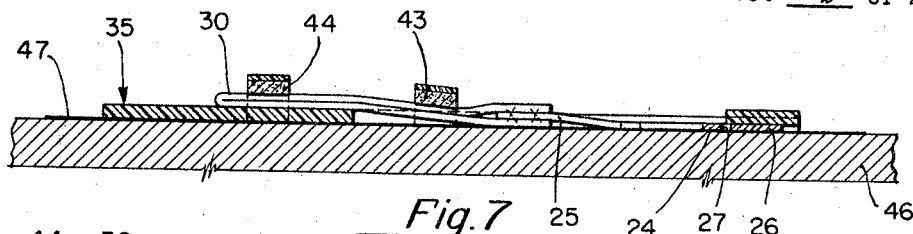
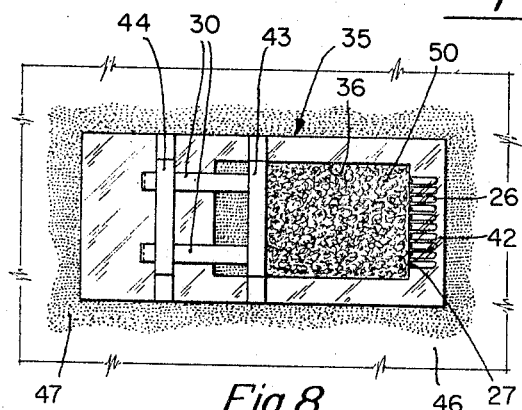
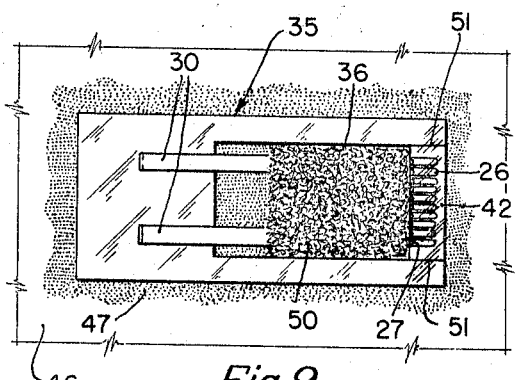
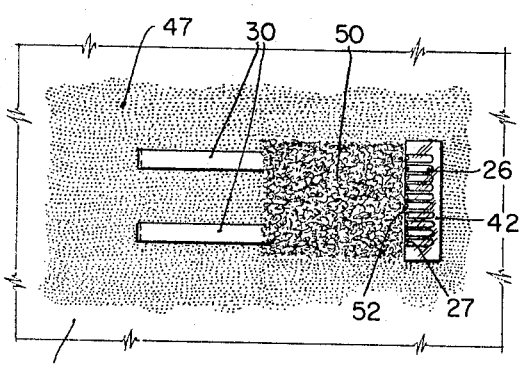
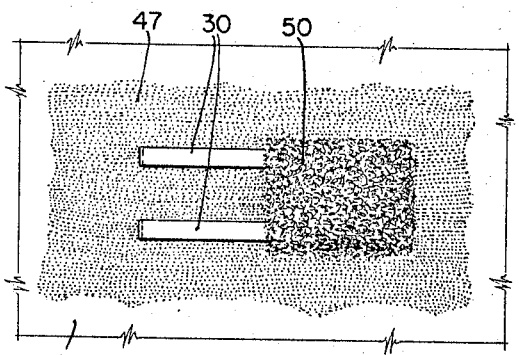
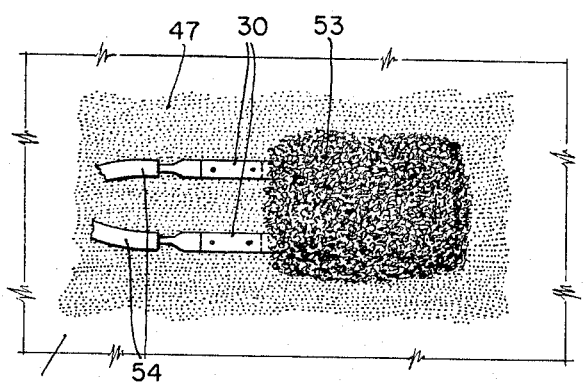

United States Patent Office 3,428,933
Patented Feb. 18, 1969

3,428,933
STRAIN GAGE UNIT AND METHOD OF APPLYING THE GAGE
Egon Gerstenberger, Phoenixville, Pa., assignor, by mesne assignments, to Automation Industries, Inc., a corporation of California
Filed Aug. 29, 1966, Ser. No. 575,765
U.S. Cl. 338—2                   11 Claims
Int. Cl. G01l *1/22;* H01c *17/00;* B32b *31/00*

ABSTRACT OF THE DISCLOSURE

A metal foil electrical resistance strain gage with tab leads welded at the factory and shipped in condition for simple installation. The gage unit is mounted on a frame card of thin, transparent material with pressure sensitive adhesive on its lower side covered by a protective sheet. The frame card has a window encompassing the entire gage unit. The gage unit is supported in the window by the handling tabs at one end engaging the pressure sensitive adhesive and with the tab leads supported by adhesive tape secured strips. In use, the gage unit is cemented to the work surface through the window. The card portion holding the handling tabs and the tape secured strips are removed, enabling removal of the frame card. The handling tabs are then removed, and the gage unit is connected in circuit.

---

This invention relates to an electrical resistance strain gage unit, particularly a unit comprising a metal foil electrical resistance type strain gage such as that disclosed in the patent to William T. Bean, Jr., No. 2,899,658, issued Aug. 11, 1959, and to an improved method and means for applying the gage, and has for an object the provision of improvements in this art.

The metal foil resistance strain gage of the Bean patent comprises a zig-zag grid with widened end junction portions and terminal conductor tabs together with elongated tear-off handling tabs at the tail end, that is, the end opposite the conductor tabs. The grid with its end junction portions and short portions of the terminal conductor tabs is the active or working part of the gage.

According to the Bean patent the metal grid gage was packaged for sale on an adherent or carrier sheet, specifically, part of the supporting sheet on which a plurality of gages were made by a micro-photo etching process; and the unit comprising the metail foil gage and backing sheet was protected by a suitable folder or envelope, or both, until ready for use.

The installation procedure of the patent consisted in first adhering the handling tabs to an adhesive handling sheet; lifting the gage off the carrier sheet by the handling sheet; laying the gage down on a wet adhesive coating on a test specimen; cutting off the handling tabs, with the handling sheet still adhered thereto; and completing the installation by applying conductor leads and a protective coating and performing such other installation details as were needed.

The installation procedure of the Bean patent was satisfactory for the most accesible places and for performance by the most skillful technicians; but it is very desirable to have a gage unit which can readily be installed by less highly skilled technicians and which is convenient for installation in less accessible locations, for example, in overhead and other difficult positions.

There have been some proposals for making the installation of gage grids upon specimens more convenient, as for example, by adhering one or more sheet strips across the working part or grid itself, and subsequently peeling, dissolving, or evaporating the carrier strips and later coating the portions which could not be previously coated while covered by the carrier strips. Obviously, such facilities and procedures may prevent initial full-flat application of the grid to the specimen; or may cause tearing of the grid; or may cause undesired overheating of the gage; or may cause contamination of the bonding zone of a nature which is difficult or impossible to eliminate; or may produce non-uniform resistance characteristics by reason of having coatings applied to different active areas at different times.

It is, therefore, one of the objects of the present invention to provide a gage unit which permits a full-flat initial laydown of all of the working portions of the gage.

Another object is to provide a gage unit which can be entirely coated with adhesive on all working portions at one operation at one time.

Another object is to provide a gage unit which can be applied wholly by elements supplied with the unit to avoid the need to provide extraneous elements in the field to aid the installation.

Another object is to provide a gage unit which has factory-installed tab leads for making circuit conductor connections to avoid the necessity for performing the delicate operation of attaching tab leads to terminal tabs in the field.

Another object is to provide a gage unit which leaves the handling tabs and tab sheet free from hold-down adhesive so they may be torn or cut away and removed after the working portion of the gage has been bonded to the specimen.

Another object is to provide an improved method of installation which avails of and is compatible with the improved package unit provided.

The above and other objects of the invention, as well as various features of novelty and advantages, will be apparent from the following description of an exemplary embodiment, reference being made to the accompanying drawings, in which:

FIG. 7 is an enlarged section and elevation taken on the line 7—7 of FIG. 6;

FIG. 8 is a plan view like FIG. 6 but showing bonding adhesive to have been applied to the working portion of the gage;

FIG. 9 is a plan view like FIG. 8 but with the tab lead hold-down strips or bars removed and the handling sheet strip severed on each side of the handling tabs in preparation for the removal of the holder card sheet from the specimen and gage;

FIG. 10 is a view like FIG. 9 but showing the holding sheet to have been peeled up and removed from the test specimen, only the handling sheet portion over the handling tabs being left;

FIG. 11 is a view like FIG. 10 but showing the handling sheet portion and handling tabs to have been severed from the gage unit and to have been peeled up and removed from the test specimen;

FIG. 12 is a plan view like FIG. 11 but showing a protective adhesive coating to have been applied over the gage and adjacent areas and circuit conductors to have been connected to the tab leads.

Figure 1:
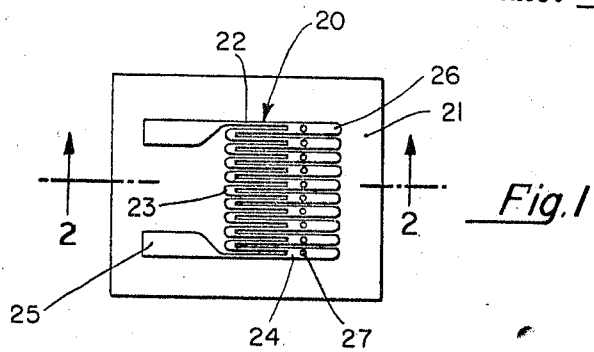
FIG. 1 is a plan view of a metal foil strain gage on the carrier sheet on which it was produced.

In the present case, as in the Bean patent and as here shown in FIG. 1, a strain gage 20 is adhesively secured on a carrier sheet 21 on which it was produced by a micro-photo etching process. The gage comprises a main or active grid which includes small resistor strips 22, terminal tab end junction elements 23, tail end junction elements 24, terminal lead connection tabs 25, and handling tabs 26 extending from the tail end junction elements 24, there preferably being provided weakening elements such as apertures 27 between the handling tabs and the active portion of the gage to indicate the line where the handling tabs may be cut off if desired. Here it may be noted that the handling tabs are mainly provided for handling and installing the gage without injury to the delicate active portion of the gage but the size of the handling tabs is so great and their resistance to current flow so extremely insignificant that it practically makes no difference whatever to the actual functioning of the gage whether or not the handling tabs are eventually removed. Herein they will be shown to have been removed, for appearance mainly. Also it may be noted that the junction elements are so large relative to the resistance strips of the gage grid that they have substantially no response to strain, the main flow of current being confined to zones near their inboard ends where connected to the resistance strips, so that the length of the junction strips beyond a certain minimum is largely a matter of mechanical strength of the grid rather than a gage function. Hence the exact location of the weakening elements in the end projections of the gage is subject to considerable variation. For appearance, at least, the junction elements at the tail end are made to have about the same length as the junction elements at the lead tab end.

Figure 2:
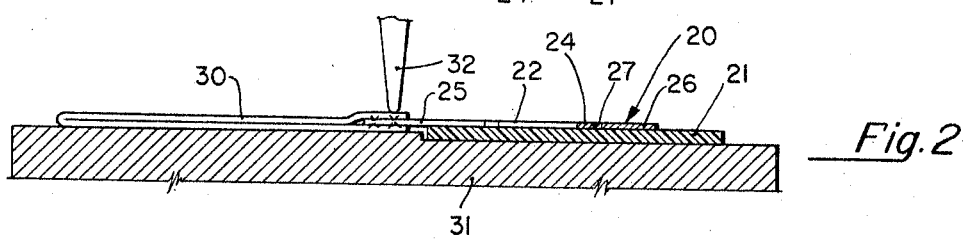
FIG. 2 is a longitudinal section and elevation showing tab leads being secured to the terminal tabs, part of the carrier sheet having been cut off to expose the ends of the terminal tabs, part of the view being taken on the line 2—2 of FIG. 1.

A feature of the present invention is that the gage unit is provided with tab leads 30 at the factory instead of leaving this delicate operation to be performed in the field. As shown in FIG. 2, the carrier sheet 21 has been separated from the terminal tabs 25 and cut off so the ends of the terminal tabs may be disposed upon a copper welding block 31 for convenient connection, as by an electrode 32, to the folded ribbon tab leads 30. The tab leads are relatively very thick as compared to the gage tabs and can be connected to circuit conductors by easily made welded joints which require no special skill and no elaborate instruments such as are needed for making the tab-lead connection. Moreover, as will be seen, the relatively stiffer tab leads assist in holding the gage securely in the package unit provided by the factory.

Figure 3:
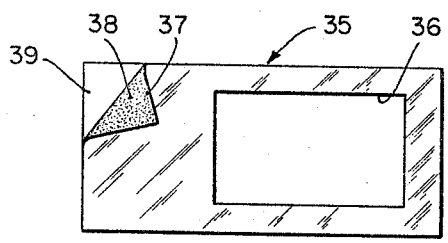
FIG. 3 is a plan view of a supporting frame card provided for supporting a gage, a corner of the adhesive-coated sheet being turned up from the protective cover sheet to show its adhesive-coated under side.

The factory unit starts with a frame card 35, FIG. 3, having a window 36, the card comprising a relatively thin transparent sheet 37 with pressure sensitive adhesive 38 on its lower side and a protective sheet 39, as of paper or plastic. Such material is freely available as "Scotch Tape" so needs no particular description as to thickness or other characteristics. As an idea, the double thickness may be in the range of 0.005".

Figure 4:
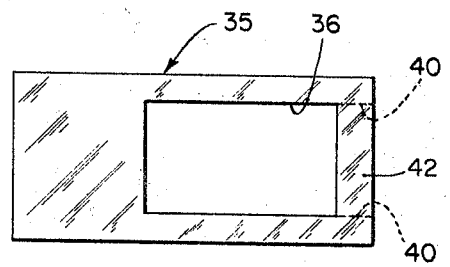
FIG. 4 is a view like FIG. 3 but showing the protective cover sheet removed at one end of the window provided in the card to expose the lower adhesive surface of a handling sheet portion which is to be adhered to the handling tab end of the gage.

First, as shown in FIG. 4, the protective sheet is removed at the tail end of the window, as by cutting on lines 40 and peeling off, to leave a handling sheet portion 42 at the tail end of the window with the exposed adhesive side disposed toward the bottom.

The frame card, as shown in FIG. 4, is brought above the gage (with leads, as shown in FIG. 2) with the leads extending upward through the opening or window; then the handling sheet portion 42 is pressed down upon the handling tabs 26 of the gage to secure them by adhesion, the side spacing and thinness of the protective sheet being such as to permit this. The leads are secured in place by a strip or bar 43 secured by adhesive tape across the window and a strip or bar 44 secured by adhesive tape on the longer end panel of the card. The gage can now easily be pulled off the less-adherent original carrier sheet 21.

Figure 5:
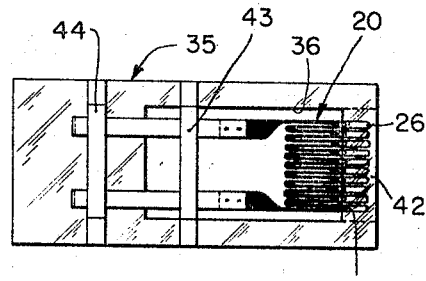
FIG. 5 is a plan view of the gage unit as produced at the factory and ready for use or sale, the protective envelope or folder in which the unit is packaged being omitted.

The factory product ready for sale and eventual use is shown in FIG. 5. A protective folder or envelope or both will be provided for the gage unit but it is not necessary to show these for an understanding of the invention. It is important to note that the entire active portion of the gage is fully exposed on both side faces in the window of the holder frame card but with the gage held securely in position although thus fully suspended from the ends.

This concludes the factory procedure. The installation procedure for application of the gage to a speciment will now be described by reference to FIGS. 6 et seq.

Figure 6:
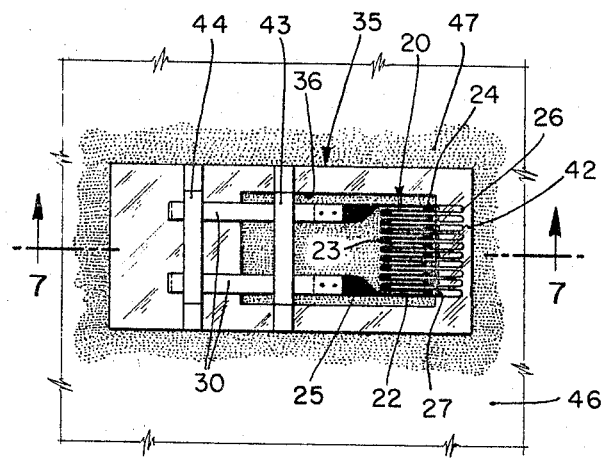
FIG. 6 is a plan view of the unit with the lower protective sheet having been fully stripped from the adhesive side of the adhesive-coated holder sheet and the unit adhered to a dried insulating coating on a test specimen.

As shown in FIG. 6, a test specimen 46 has had placed over a carefully cleaned area a base coating 47 of an insulating cement, a ceramic cement commonly being used.

All of the remaining portions of the protective sheet 39 of the gage unit are peeled from the adhesive sheet 37 leaving the adhesive coated face exposed. The bars 43 and 44 assist in holding the thin sheet in flat condition. The gage unit is now carefully placed upon the base coating layer 47, the contact pressure cement coating holding the frame card sheet securely and accurately in position and with the active working portion of the gage held fully exposed in the window of the card. The unit is very flexible so as to lie well on either flat (plane) or curved surfaces, as may be required.

FIG. 7 shows in enlargement, though out of relative scale for clarity of illustration, how the gage and card appear in section and elevation when laid down on the test specimen. It will be noted that the gage is disposed lowermost where even the small thickness of the holder sheet cannot hold any part of it out of close direct contact with the base coating on the test specimen.

After the gage unit has been laid down, and as shown in FIG. 8, the active area of the gage which is fully exposed over its entire surface, above and below, that is, the part disposed in the opening defined between the sides of the window and the space between the transverse bar 43 and the handling sheet portion 42, is coated with an adhesive bonding layer 50 which flows under the gage elements to bond them to the homogeneous base coating 47 as well as forming a protective shielding cover over the gage. Where the holder sheet is held down on the sides and ends of the window opening the underflow of bonding cement is inhibited; which means that when and if desired, the holding sheet and handling tabs as well as the holding frame card can later be easily removed. The bonding cement is applied in known manner by gentle jiggling brush strokes mainly along the length of the grid resistor strips. After application, the bonding layer is dried and hardened in known manner, as by radiant heat or warm air currents or both. More than one coating application may be desired and, as usual, full cooling is allowed before another coating is applied in order to prevent blisters, wrinkles, and the like.

After the working area of the gage has been fully bonded, as described, the holding frame card and other undesired elements may be removed. Some variations in the clean-up procedures are permissible, the procedure thus far found to be most convenient being generally illustrated in FIGS. 9 to 11.

As shown in FIG. 9, the hold-down bars 43 and 44 have been removed to free the tab lead ribbons 30 from the frame card. The frame card can now be peeled up off the specimen with the tab leads coming through the window of the card and the handling tabs coming up with the handling sheet which is the tail end portion of the window frame formed by the card. The handling tabs should tear off at the line of weakening across the perforations or apertures 27, especially since the working area of the gage is now firmly bonded to the specimen.

However, lest the separation may be attempted before the bonding coating is fully dry or that the handling tabs may not tear off where intended, it has been found preferable to first separate the handling sheet 42 from the rest of the card frame, as by making cuts along the lines 51, as shown in FIG. 9. The card portions remaining can now be peeled up and removed by movement away from the tail end and toward the tab end thereby more easily pulling the tab leads out of the window.

If it is desired to remove the handling tabs these may be peeled up with the handling strip 42, preferably a cross cut 52 being made at the tear line of the apertures 27. FIG. 11 shows the handling sheet and handling tabs to have been removed.

After the clean-up operations have been completed, and as shown in FIG. 12, one or more coatings 53 are applied over the whole area for protection and the lead conductors 54 for circuit connection are secured to the tab leads 30, as by welding.

In review, the installation procedure, after a gage 20 with handling tabs 26 has been etched on a carrier sheet 21, is to provide the gage with tab leads 30 and to support the gage in the window of a handling frame card with the working area of the gage fully exposed over its entire area in the window, specifically the gage being picked up from the carrier sheet by the handling sheet portion 42 when adhered to the handling tabs of the gage and with the tab leads 30 secured to the card to carry the other end of the gage. The grid per se is so very light as compared to its length and weight that in spite of its extreme thinness the tab end does not move out of position even though it is not directly connected to supporting means at the tab end. As stated, the gage unit is held flat in a folder until ready for installation on a specimen.

The factory-produced gage unit of FIG. 5 not only provides full gage support but has the tab leads 30 already attached so as to relieve the field technician from performing this delicate operation in difficult conditions and possibly without suitable tools. Moreover, the gage has been removed from its original carrier sheet and has been provided with a handling sheet for its handling tabs, thus avoiding the need to perform further delicate operations in the field.

As to field installation, it is only necessary to peel the protective sheet 39 from the unit, lay it on the coated specimen, press it down, and apply bonding adhesive over the working area of the gage which is fully exposed in the space defined by the sides of the window space. Thereafter the holding elements are removed in the manner described.

It is thus seen that the gage unit and the method of installing the gage hereby provided insure better installations, far greater certainty of obtaining proper installations even by less skilled technicians, and greatly reduce the time and expense of making installations, especially under difficult conditions.

While one embodiment of the invention has been described for purposes of illustration, it will be apparent that there may be various embodiments and modifications within the general scope of the invention.

I claim:

1. A strain gage unit for a strain gage having a strain-sensitive working grid portion and non-working portions connected to and extending in different directions from said working portion, comprising a holder frame card having a window of a size to receive in the clear in fully exposed condition all of the working portions of the gage, and means for securing the non-working portions of said gage to the frame portion of said frame card around said window and with the working portion of the gage supported in said window.

2. A strain gage unit as set forth in claim 1, further characterized by the fact that said frame card comprises a holder sheet having an adhesive coating on one side and with one of said non-working portions of the gage adhered to said holder sheet.

3. A strain gage unit as set forth in claim 1, wherein said strain gage has tail-end handling tabs constituting part of said non-working portions and terminal tab leads constituting another part of said on-working portions, and means securing said handling tabs and tab leads to the sides of the frame card around the window opening in which said working portion of the gage is positioned in full exposure.

4. A strain gage unit as set forth in claim 3, further characterized by the fact that said handling tabs are adhesively secured to an exposed portion at the tail end of an adhesively coated sheet of said card and that the other portions of the adhesive side of said adhesive-coated sheet are left covered with a protective sheet to be peeled off when the gage unit is to be installed, and that said tab leads are brought out over the edge of the window and are held down by bars secured above them to the frame card.

5. The method of installing a strain gage having a working grid including resistance strips, end junction elements for the grid strips, together with terminal tabs and non-working handling tabs, which comprises, suspending the full area of the working grid portion of the gage in the open window of a holding frame card window by means attached to said terminal tabs and handling tabs, placing said holding frame card and gage on a test specimen, adhesively bonding the full working portion of said gage to the specimen by a single application of adhesive through the window opening over the full working portion of the gage, and subsequently removing undesired parts of the card-grid unit.

6. The method as set forth in claim 5, which further comprises, securing tab leads to said terminal tabs before the gage is mounted on said frame card, and securing the tab leads to said card after the gage is mounted on said card, the handling tabs and tab leads constituting non-working attaching portions for the work portions of the gage.

7. The method as set forth in claim 5, which further comprises, removing part of the non-working supporting means for the gage together with the part of the holder frame card by which it is carried from the specimen after the working portion of the gage has been adhesively bonded to the specimen.

8. The method as set forth in claim 5, which further comprises, cutting away from the main part of the frame card part of the card to which part of the non-working supporting part of the gage is attached after the adhesive has bonded the working portion of the gage to the specimen to facilitate the removal of the frame card from the specimen.

9. The method of installing a metal foil strain gage which is produced on a carrier sheet, the gage having a strain responsive working grid portion with grid strips and connecting end terminals and having non-working handling metallic tabs and terminal tabs, which comprises, providing a holder frame card with a window of a size to expose the full working portion of the gage, the frame card including a holder sheet with a pressure sensitive adhesive coating on one surface and a protective sheet over the adhesive-coated surface of the adhesive holder sheet, securing tab leads to the terminal tabs of the gage, removing a portion of the protective sheet over the adhesive surface at one end of the window to provide a handling sheet portion for the handling tabs of the gage, pressing the adhesive side of said handling sheet portion down upon the handling tabs of the gage to secure them adherently, lifting the gage from its carrier sheet by said adhered frame card, and bringing the tab leads through the card window and securing them down upon the card by transverse holding bars.

10. The method as set forth in claim 9, which further comprises, fully removing the protective sheet from said adhesive sheet, securing the unit to a specimen by the adhesive sheet, applying bonding cement to the fully exposed working portion of the gage in the window of said adhesive sheet, cutting away said handling sheet portion from the adhesive holder sheet, and removing the holding bars from the tab leads in preparation for removing the frame card from the specimen after the working portion of the gage has been bonded to the specimen.

11. The method as set forth in claim 10, which further comprises, severing the handling tabs from the gage and removing them from the specimen together with the handling sheet portion of the frame card to which they are secured, and applying a protective adhesive coating over the bonded working portion of the gage and adjacent areas.

References Cited

UNITED STATES PATENTS

| | | | |
|---|---|---|---|
| 2,899,658 | 8/1959 | Bean | 338—2 |
| 2,963,773 | 12/1960 | Starr | 338—2 X |
| 3,082,139 | 3/1963 | Clark | 338—2 X |
| 3,314,033 | 4/1967 | Wnuk | 338—2 |

REUBEN EPSTEIN, *Primary Examiner.*

U.S. Cl. X.R.

29—592, 610; 156—241, 248, 249

Dedication 3,428,933.—*Egon Gerstenberger*, Phoenixville, Pa. STRAIN GAGE UNIT AND METHOD OF APPLYING THE GAGE. Patent dated Feb. 18, 1969. Dedication filed July 8, 1982, by the assignee, *Vishay Intertechnology, Inc.*

Hereby dedicates to the Public the remaining term of said patent with all issued claims.

[*Official Gazette Aug. 31, 1982.*]